United States Patent [19]

Terada et al.

[11] Patent Number: 5,414,529
[45] Date of Patent: May 9, 1995

[54] IMAGE COMBINING IN IMAGE PROCESSING APPARATUS

[75] Inventors: Yoshihiro Terada; Kazuyasu Sasuga; Katuyuki Kouno; Kazuman Taniuchi; Hiroshi Sekine; Masahiro Ishiwata, all of Kanagawa, Japan

[73] Assignee: Fuji Xerox Co., Ltd., Tokyo, Japan

[21] Appl. No.: 887,424

[22] Filed: May 13, 1992

[30] Foreign Application Priority Data

May 14, 1991 [JP] Japan .................. 3-107968

[51] Int. Cl.⁶ .............................. H04N 1/40
[52] U.S. Cl. ..................... 358/448; 358/456; 358/500; 358/518
[58] Field of Search ............ 358/448, 75, 12, 13, 358/133, 260, 80, 77, 327, 79, 443, 456, 22, 261.1, 81, 78, 11, 464, 79

[56] References Cited

U.S. PATENT DOCUMENTS

| | | | |
|---|---|---|---|
| 4,768,082 | 8/1988 | Hiratsuka et al. | 358/13 |
| 4,772,911 | 9/1988 | Sasaki et al. | 358/298 X |
| 4,819,193 | 4/1989 | Imao | 358/80 |
| 4,965,663 | 10/1990 | Sasaki | 358/80 |
| 4,965,664 | 10/1990 | Udagawa et al. | 358/80 |
| 4,975,768 | 12/1990 | Takaraga | 358/75 |
| 4,979,129 | 12/1990 | Okubo et al. | 358/401 |
| 4,982,277 | 1/1991 | Katoh et al. | 358/80 |
| 5,081,527 | 1/1992 | Naito | 358/75 |
| 5,105,267 | 4/1992 | Hayashi | 358/80 |
| 5,181,068 | 1/1993 | Morikawa | 358/456 X |
| 5,181,105 | 1/1993 | Udagawa et al. | 358/80 |

FOREIGN PATENT DOCUMENTS

| | | |
|---|---|---|
| 61-220072 | 9/1986 | Japan . |
| 62-139081 | 6/1987 | Japan . |
| 63-182781 | 7/1988 | Japan . |
| 64-23677 | 1/1989 | Japan . |
| 2-65368 | 3/1990 | Japan . |
| 2-223275 | 9/1990 | Japan . |

Primary Examiner—Paul Ip
Attorney, Agent, or Firm—Finnegan, Henderson Farabow, Garrett & Dunner

[57] ABSTRACT

An image processing system assigns weight factors to two respective image signals of the equivalent color space so that the two image signals are combined according to the respective weight factors. For example, two weight factors having a sum of unity are assigned to the respective image signals. Alternatively, two weight factors are assigned independently.

6 Claims, 8 Drawing Sheets

IMAGE COMBINING IN IMAGE PROCESSING APPARATUS

BACKGROUND OF THE INVENTION

The present invention relates to a picture processing apparatus which can process a plurality of input image picture signals.

A digital copier consists of an image input terminal (IIT) for reading an original document, an image processing system (IPS) for processing resultant picture data, and an image output terminal (IOT) for producing copies based on the picture data by driving, for instance, a laser printer. The IIT picks up, using a CCD sensor, picture information on the original document to produce an analog electrical signal that is in accordance with a reflectivity distribution on the document, and converts it into digital picture data having multi-gradations. The IPS processes the picture data sent from the IIT to perform various corrections, conversions, editing operations, etc. The IOT produces dot pictures by on/-off-controlling a laser of the laser printer based on the picture data that has been subjected to the various processes in the IPS.

By virtue of the processes performed in the IPS, this type of digital copier can properly produce pictures in accordance with the kind of picture data having multi-gradations. For example, in the case of characters or the like, edge-enhanced sharp pictures are produced. In the case of half-tone pictures such as photographs, smoothed-out pictures are produced. Further, resolution-adjusted color pictures having high reproduction performance can also be produced. Further, pictures can be produced which have been subjected to various editing operations such as painting, color conversion, trimming, shifting, combining, reduction and enlargement. A color digital copier is constructed such that the IIT provides the IPS with picture data that is produced from color-decomposed signals of the three primary colors of R (red), G (green) and B (blue) while reading the original document, and that the IOT superimposes dot pictures of respective colorants of Y (yellow), M (magenta), C (cyan) and K (black) one on another. A color picture processing apparatus such as the above color digital copier employs individual developers for the above respective colorants, and four scanning operations are performed in accordance with development processes of the respective colorants while at each scanning the original document is read and full color picture data is processed.

Next, the above type of color digital copier is summarized below using, as an example, a configuration that is proposed by the present assignee in, e.g., Japanese Patent Application Unexamined Publication No. Hei. 2-223275 (which corresponds to U.S. patent application Ser. No. 07/482,977).

FIG. 7 shows an example of a configuration of a conventional color digital copier. In FIG. 7, IIT 100 reads a color document using a CCD line sensor to produce color-decomposed signals of the three primary colors of light, B, G and R, and converts those signals into digital picture data. IOT 115 reproduces color pictures by performing laser beam exposure and development. An END (equivalent neutral density) conversion module 101 through an IOT interface 110, that are provided between the IIT 100 and the IOT 115, constitute a processing system of editing the picture data, i.e., an image processing system (IPS), which converts the picture signals of B, G and R into colorant signals of Y, M, C and K, and provides the IOT 115 with the colorant signal that corresponds to the development color in each development cycle.

The IIT 100 reads the document using the CCD line sensor at a resolution of 16 dots/mm for each of B, G and R, and outputs the digital picture data of 24 bits (8 bits×3 colors; 8 bits mean 256 gradations). In the CCD sensor, R, G and B filters are mounted on its top surface, and sensor elements are arranged at a density of 16 elements/mm over a length of 300 mm. The CCD sensor performs a sub-scanning operation of 16 lines/mm at a process speed of 190.5 mm/sec. As a result, the reading and data output rate of the image sensor is approximately 15 mega-pixels/sec for each color. In the IIT 100, the reflectivity information is converted into the density information by subjecting the analog signals of B, G and R pixels to a logarithmic conversion, and further the logarithm-converted analog signals are converted into the digital data.

Receiving the color-decomposed signals of B, G and R from the IIT 100, the IPS performs various data processing operations to improve the reproduction performances of color, gradations, resolution, etc., and provides an on/off colorant signal of a development process color to the IOT 115. The END conversion module 101 performs an adjustment (conversion) operation to produce gray-balanced color signals. A color masking module 102 performs an matrix operation on the B, G and R signals to produce signals representing amounts of colorants of Y, M and C. A document size detection module 103 detects the document size in the pre-scanning operation, and performs platen-color elimination (frame erasing) in the scanning operation for reading the document. A color conversion module 104 performs a color conversion operation of a specified color in a specific area determined by an area signal sent from an area picture control module 111. An UCR (under color removal) and black generation module 105 generates a proper amount of K to prevent color impurities and reduce the respective amounts of Y, M and C by an equivalent amount in accordance with the amount of K thus generated. Further, the UCR and black generation module 105 gates the K signal and the under-color-removed Y, M and C signals in accordance with a mono-color-mode signal or a 4-full-color-mode signal. A spatial filter 106 is a nonlinear digital filter having functions of restoring a non-blurred picture and removing a moiré phenomenon. To improve the reproduction performance, a TRC (tone reproduction control) module 107 performs density adjustment, contrast adjustment, negative/positive inversion, color balance adjustment, etc. A reduction/enlargement module 108 performs an reduction/enlargement operation in the main scanning direction. The reduction/enlargement in the sub-scanning direction is performed by adjusting the document scanning speed. A screen generator 109 converts the colorant signal of the process color having multi-gradations into an on/off signal (i.e., binary signal) in accordance with its gradation level. The binary colorant signal is provided to the IOT 115 via an IOT interface module 110. The area image control module 111 has an area generation circuit 112 and a switch matrix 113. An editing control module 114 has an area command memory 115, a color pallet video switch circuit 116 and a font buffer 117, etc., and performs a variety of editing control operations.

The area image control module 111 has such a configuration that seven rectangular areas and their priority orders can be set in the area generation circuit 112. Control information for each area is set in the switch matrix 113. The control information includes color conversion information, color mode information indicating one of the mono-color mode, full-color mode and other color modes, modulation selecting information of a photograph, characters, etc., which are used in controlling the color masking module 102, color conversion module 104, UCR and black generation module 105, spatial filter 106 and TRC module 107. The switch matrix 113 can be formed in the form of software.

The editing control module 114 enables a painting operation that is required when a document having a non-rectangular portion, such as a circular graph and a specified area having an arbitrary shape is to be painted a specified color. An area command of 4 bits is written into four plane memories, in which the area command for each point on the document is set by 4 bits of information stored in the plane memories.

In the conventional color digital copier as described above, when a character combining operation is performed, for instance, a certain threshold is established with respect to a character luminance signal, and characters are produced if the character luminance signal is larger than the threshold and an image produced if it is smaller than the threshold.

In the case of combining texture images consisting of structural patterns, for instance, an AC component of a texture image is separated using some boundary value, e.g., its average value paying attention to a luminance signal, and the AC component thus obtained is added to or subtracted from an image. However, this process cannot accommodate a case in which data of two images overlap with each other, such as a perspective combining process.

Therefore, in a perspective combining process of two images stored in a memory, a perspective image is produced by combining two image data alternately read from the memory, as disclosed in Japanese Patent Application Unexamined Publication Nos. Sho. 62-139081 and Sho. 64-23677. Alternatively, a perspective image is produced by taking logical sum of BGR (YMC) image data or determining, on a pixel-by-pixel basis, an average value of two BGR (YMC) data.

However, in the combining method of alternately reading two image data, since the pixel selection is performed with certain regularity, there exist such a problem that a component of a particular frequency existing in a combined image causes defects such as a moiré pattern. In the methods of using the logical sum or average value, the combining factors cannot be adjusted in accordance with original images. Further, in the case of using the logical sum, the total density of an image is increased. In the case of using the average value, the BGR or YMC signals depend on characteristics of a filter of the IIT and the colorants of the IOT.

SUMMARY OF THE INVENTION

An object of the present invention is to increase the degree of freedom of selecting the combining factors and to make it possible to combine black-and-white images by a process similar to that for color images.

Another object is to make it possible to perform a combining operation independently of an apparatus.

According to the invention, an image processing apparatus comprises:

first color conversion means for converting a plural sets of color-decomposed signals representing a plurality of images into a plural sets of equivalent color space signals;

image processing means for combining the plural sets of equivalent color space signals to produce a set of combined equivalent color space signals representing a combined image; and second color conversion means for converting the set of combined equivalent color space signals into a set of colorant signals to be used for reproducing the combined image.

With the above basic construction, since the combining operation is performed on the image signals of the equivalent color space, it can be performed based on the lightness information and the chromaticity information. If the weight factors having a sum of unity are assigned to the two respective image signals, the lightness and the chromaticity as a whole are kept substantially the same as those before the signals are subjected to the combining operation. The degree of contribution of the respective images can be set freely, or independently for the lightness information and the chromaticity information. Further, the chromaticity information can be set in a separate manner. As a result, a wide variety of combining operations, such as mono-color combining, can be realized.

DESCRIPTION OF THE PREFERRED EMBODIMENTS

Embodiments of the present invention are described hereinafter with reference to the accompanying drawings.

Figure 1A:
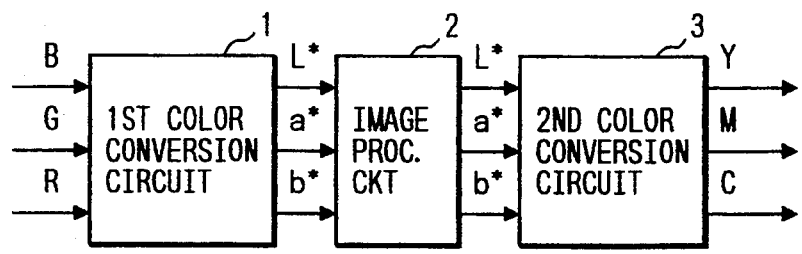
FIGS. 1(a)–1 (c) show the main part of an image processing apparatus according to an embodiment of the present invention.
Figure 1B:
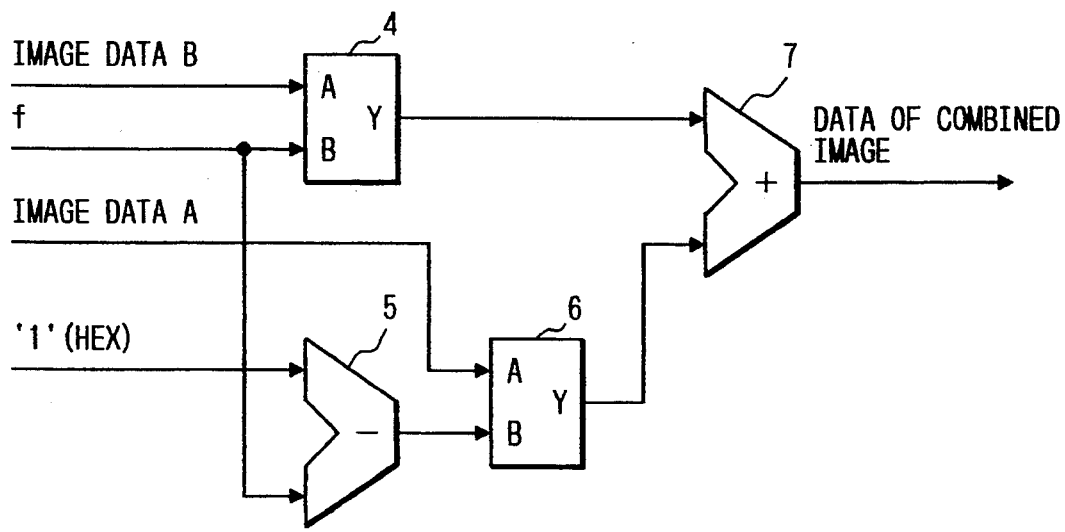
Figure 1C:
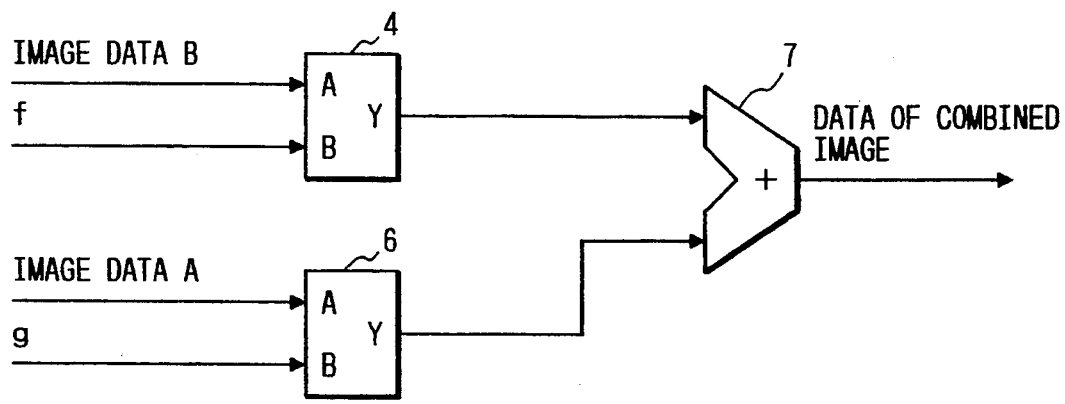

FIGS. 1(a)–1(c) show the main part (i.e., the part related to an image combining process) of an image processing apparatus according to an embodiment of the invention.

As shown in FIG. 1(a), a first color conversion circuit 1 converts color-decomposed signals of B, G and R, that have been produced by an image reading means using, for instance, a CCD line sensor and represent a reflectivity distribution, into system values $L^*$, $a^*$ and $b^*$ of the equivalent color space. The $L^*$-axis represents lightness, and saturation and hue are expressed in the two-dimensional plane defined by the $a^*$- and $b^*$-axes that are perpendicular to the $L^*$-axis. An image processing circuit 2 performs editing operations such as a combining operation according to the invention, an image data input/output operation with external systems, and other image processing operations using the signals L*, a* and b* of the equivalent color space. A second color conversion circuit 3 converts the signals L*, a* and b* of the equivalent color space into colorant signals Y, M and C to be used in an image output means.

FIG. 1(b) shows an example of a configuration of a perspective combining circuit included in the image processing circuit 2. A multiplier 4 multiplies image data B by a combining factor "f". A subtracter 5 subtracts the combining factor "f" from "1", and a multiplier 6 multiplies an image signal A by a resultant difference "1-f". An adder 7 adds the outputs of the multiplier 4 and the multiplier 6 together to produce combined image data. The perspective combining operation having the proportion of f:(1-f) is performed by using the circuit of FIG. 1(b) for each of the signals L*, a* and b* of the equivalent color space to combine the image data A and B.

FIG. 1(c) shows another example in which the subtracter 5 of FIG. 1(b) is omitted and multiplication factors "f" and "g" for the respective image signals B and A can be set independently. With this configuration, for instance, even an image having high densities or low densities as a whole can properly be subjected to the combining operation by adjusting the multiplication factors "f" and "g".

Figure 2A:
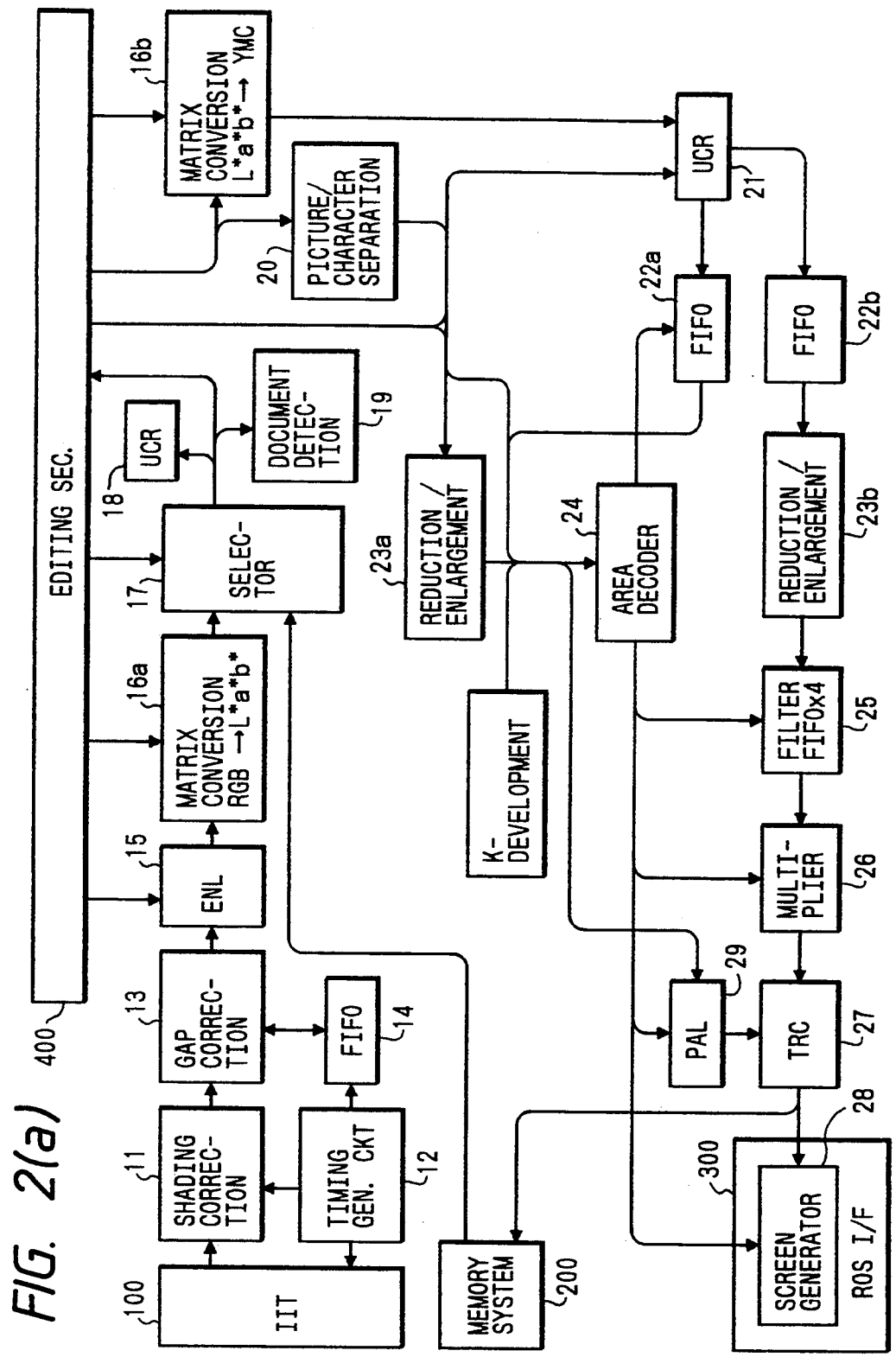
FIGS. 2(a) and 2(b) show an example of a configuration of a signal processing system of the image processing apparatus.
Figure 2B:
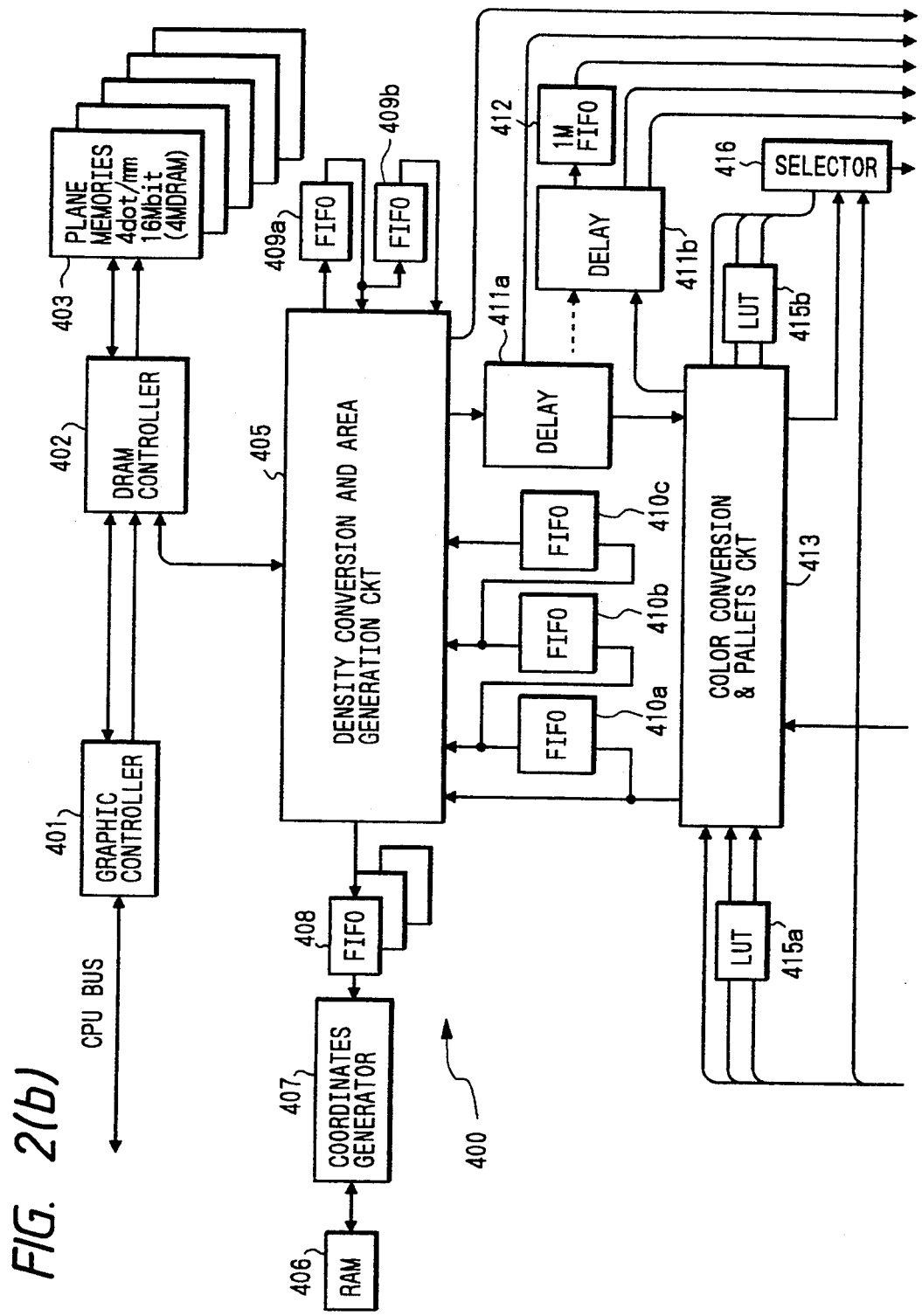
Figure 3:
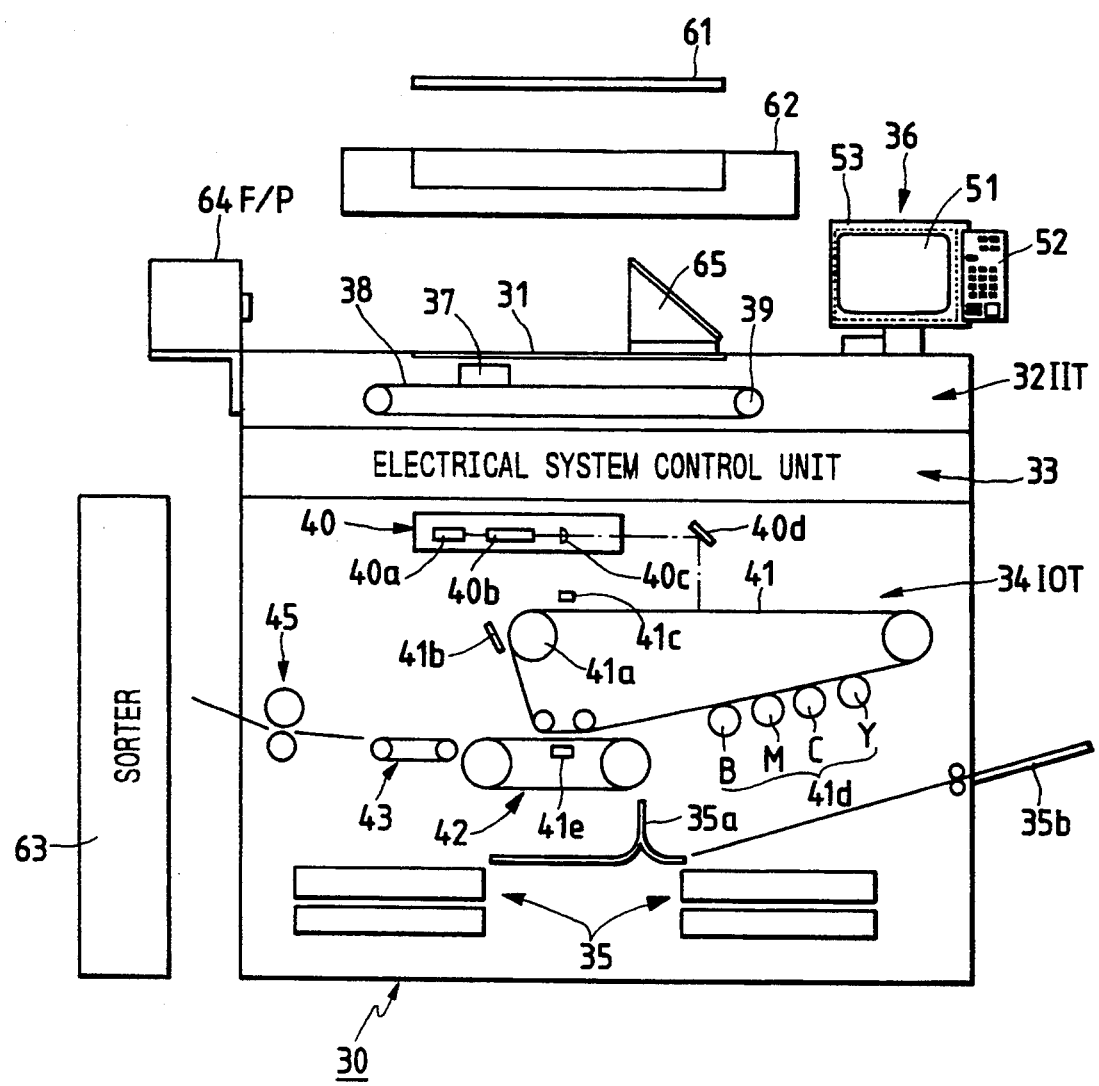
FIG. 3 shows a color copier to which the invention is applied.

Next, the whole image processing apparatus according to an embodiment of the invention is described. FIGS. 2(a) shows an example of a configuration of a signal processing system of the image processing apparatus, and FIG. 2(b) shows details of an editing section 400 of FIG. 2(a). FIG. 3 shows an example of the image processing apparatus.

In FIG. 2(a), an image input terminal (IIT) 100 has, for instance, a reduction-type image sensor consisting of three CCD line sensors of B, G and R arranged perpendicularly to the sub-scanning direction. The image sensor performs a scanning operation in the main scanning direction in synchronism with a timing signal sent from a timing generation circuit 12 to read a document image while moving in the sub-scanning direction at a speed in accordance with a reduction/enlargement factor. Analog image data is converted into, e.g., 8-bit digital image data having gradations. The digital image data is subjected to shading correction in a shading correction circuit 11 to correct for variations among pixels due to various factors, and to gap correction in a gap correction circuit 13 to correct for a gap between the respective line sensors. In the gap correction, the image data, that has been obtained by reading the document image, is delayed by FIF0 14 by a time corresponding to the gap between the CCD line sensors so that the image data of B, G and R of the same position are obtained at the same time point. An ENL (equivalent neutral lightness) conversion circuit 15 performs gray balancing of the image data using parameters that are in accordance with the type of document. Further, the ENL conversion circuit 15 performs negative/positive inversion by reversing, on a pixel-by-pixel basis, the manner of taking a gray level based on a negative/positive inversion signal from an editing section 400 (described later) so that, for instance, the negative/positive inversion is effected only in a specified area.

The image data of B, G and R that has been subjected to the process of the ENL conversion circuit 15 is converted, for instance, into signals L*, a* and b* of the equivalent color space by a matrix conversion circuit 16a. The L*-, a*- and b*-axes of the equivalent color space are orthogonal axes, and the L*-axis represents lightness, and the a*- and b*-axes form the chromaticity plane (hue and saturation). The conversion into the signals L*, a* and b* of the equivalent color space provides such advantages that the interface with external systems such as a computer can be facilitated via a memory system 200, and that the color conversion, editing operation and image signal detection can also be made easier. A selector 17 selects between the output image data of the matrix conversion circuit 16a and the image data from the memory system 200 as the interface with external systems, or takes both image data at the same time, to perform texture combining operation or perspective combining operation. Therefore, the selector 17 has the functions of setting the combining factors and performing computations and the combining operation.

An UCR (under color removal) circuit 18 is intended to improve the copying quality of foggy original documents such as newspapers, for example, by detecting the under color density by producing a histogram of the document density during the pre-scanning operation, and skipping pixels having a density lower than the under color density. A document detection circuit 19 detects the size of the document by determining a circumscribed rectangular by detecting a boundary between a black back surface of the platen and the document, and stores the detected size. The UCR circuit 18 and the document size detection circuit 19 utilize the lightness signal L* among the signals of the equivalent color space.

The editing section 400 sets an area command to be used for changing over the editing process, parameters, etc. for each area, and generates an area control signal based on the area command. The editing section 400 further performs, on the image data, operations such as color editing, color conversion and marker color detection. The image data subjected to such processes is input to the matrix conversion circuit 16a and to a picture/character separation circuit (TIS circuit) 20.

The matrix conversion circuit 16a processes the image data that has been subjected to the editing processes to convert the signals of L*, a* and b* into the toner color signals of Y, M and C. The picture/character separation circuit 20 discriminates among areas of color characters, black characters, pictures (characters/halftone) while forming a block of a plurality of pixels. The UCR circuit 21 generates data of black (K) and removes equivalent amounts of Y, M and C based on the image data of Y, M and C provided from the matrix conversion circuit 16a in accordance with a mono-color/full-color signal, and produces image data of the process color. The UCR circuit 21 further performs hue judgment to generate a hue signal. In the discrimination process of the picture/character separation circuit 20, an area discrimination signal is delayed, e.g., by 12 lines because of the formations of blocks. FIFOs 22a and 22b times the hue signal and the image data to this delayed area discrimination signal.

A reduction/enlargement circuit 23b performs a reduction/enlargement operation on the image data in accordance with a specified reduction/enlargement factor. Since reduction/enlargement in the sub-scanning direction is performed in the IIT 100 by changing the sub-scanning speed in accordance with the reduction/enlargement factor, the reduction/enlargement circuit 23b thins or interpolates the image data only in the main scanning direction. A reduction/enlargement circuit 23a reduces or enlarges the area command so that areas in which the area control information is to be executed are not deviated in the manner corresponding to the reduction/enlargement operation. The area control information subjected to the reduction/enlargement operation is decoded by an area decoder 24, and then subjected to the operations of the respective processing blocks. The area decoder 24 generates changeover signals for parameters of a filter 25, coefficients of a multiplier 26 and parameters of a TRC circuit 27 from the area command, the area discrimination signal and the hue signal, and distributes such changeover signals to the respective processing blocks.

The filter 25 performs, on the image data that has been reduced or enlarged by the reduction/enlargement circuit 23b, the operations of halftone moiré removal and character edge emphasis. The TRC circuit 27 performs density adjustment using a conversion table in accordance with characteristics of the IOT. PAL 29 is a decoder for changing over parameters of the conversion table of the TRC circuit 27 based on the development process and the area discrimination signal. The multiplier 26 performs a calculation of (ax+b) on the image data x using coefficients a and b, which are changed over such that the multiplier 26 is just passed for halftone images and coefficients of a high-$\gamma$ characteristic are provided for characters. By using the multiplier 26 in combination with the TRC circuit 27 and by properly selecting the coefficients and conversion table for the respective colors, color and density adjustments for color characters, black characters and pictures are performed. The character edge emphasis can be adjusted by means of the coefficients a and b by standardizing the parameters of the filter 25. The image data thus adjusted is stored in the memory system 200, or dot-developed and output as a dot image by a screen generator 28 of a ROS interface 300.

Referring to FIG. 2(b), a configuration of the editing section 400 is described below in detail. Receiving the image data L*, a* and b* from the selector 17, the editing section 400 performs such operations as the color conversion, color editing and generation of the area control signal. LUT 415a converts the chromatic information in the form of orthogonal coordinates a* and b* into that in the form of polar coordinates C* (chromatics) and H* (hue) to facilitate the color detection of a marker color etc., color editing, color conversion, etc. Having, for instance, 32 kinds of pallets for colors to be used in the color conversion and color editing, a color conversion and pallets 413 performs, on the image data L*, C* and H*, operations such as the marker color detection, color editing and color conversion in accordance with the area command sent via a delay circuit 411a. Only the image data of the selected area to be subjected to the operations such as the color conversion is processed in the color conversion and pallets 413, inverse-converted from the data C and H into data of a* and b*, and then provided to a selector 416. The image data of the remaining areas is directly sent to the selector 416. The image data are provided from the selector 416 to the matrix conversion circuit 16b described above.

A 4-bit signal representing a marker color (3 colors) and a closed area, that has been detected in the color conversion and pallets 413 from the image data, is sent to a density conversion and area generation circuit 405, which performs density conversion from 400 spi to 100 spi by a binarizing operation with 4×4 windows using FIFOs 410a–410c, in which operation a value "1" is established when there exist not less than a predetermined number of black pixels in 16 pixels. The marker signal (e.g., a closed loop and a marker dot) thus generated is provided from the density conversion and area generation circuit 405 to plane memories 403 via a DRAM controller 402.

To avoid erroneously detecting small dust etc. as a marker, FIFOs 408 delay the marker dot signal by three lines to produce 3×3 windows, which is then subjected to marker dot detection and a coordinates generation in the coordinates generation circuit 407, and finally stored into a RAM 406. This process is performed to prevent the erroneous detection although the marker dot is also stored into the plane memories 403.

The plane memories 403 are memories for storing the area commands to be used for the color conversion, color editing and other area editing operations. For example, a particular area can be specified from an editing pad, and an area command for that area can be written into the plane memories 403. More specifically, the area command for that specified area, which has been specified using the editing pad, is transferred via a CPU bus to a graphic controller 401, and then written into the plane memories 403 via the DRAM controller 402. The plane memories 403 consist of four planes, in which 16 area commands (i.e., 0-15) can be set.

The 4-bit area command stored in the plane memories 403 is read out in synchronism with the output of the image data, to be used for the editing operation in the color conversion and pallets 413, as well as for changing over the parameters, etc. of the image data processing blocks of FIG. 2(a), i.e., the ENL conversion circuit 15, matrix conversion circuit 16, selector 17 and UCR circuit 21, and further the filter 25, multiplier 26, TRC circuit 27, screen generator 28, etc. (via the area decoder 24). When the area command is read from the plane memories 403 to be used for the editing operation in the color conversion and pallet 413 and the changing over of the parameters in the image data processing blocks, the density conversion from 100 spi to 400 spi is required. This is done by the density conversion and area generation circuit 405. The density conversion and area generation circuit 405 performs such density conversion by producing blocks of 3×3 using FIFOs 409a and 409b and performing data interpolation using that pattern, to prevent a problem that the boundary of a closed-loop curve or editing area is zigzagged. Delay circuits 411a and 411b, 1M FIFO 412, etc. are for the timing adjustment between the area command and the image data.

In the above signal processing system, the image combining operation of the invention can also be performed in the color conversion and pallet 413 by fetching the image data from each of the IIT 100 and the memory system 200 by properly controlling the selector 17.

FIG. 3 shows a color copier to which the invention is applied. A base machine 30 includes a platen glass 31 on which an original document is to be placed, an image input terminal (IIT) 32, an electrical system control unit 33, an image output terminal (IOT) 34, paper trays 35, a user interface (I/F) 36. Following parts can be provided optionally: an editing pad 61, an automatic document feeder (ADF) 62, a sorter 63 and a film image reading device consisting of a film projector (F/P) 64 and a mirror unit (M/U) 65.

Having an imaging unit 37, a wire 38 for driving it, a drive pulley 39, etc., the IIT 32, actually the imaging unit 37 reads image information of a color document by a CCD line sensor while decomposing the reflection light into components of the primary colors B, G and R of light by color filters. Further, the IIT 32 converts the signals thus obtained into digital image data BGR, which is input to an image processing system (IPS). Placed in the electrical system control unit 33, the IPS receives the image data of BGR, and performs various converting and correcting operations for improving the color, gradations, resolution and other image quality characteristics, and reproduction performance, as well as various operations such as an editing operation. The IPS produces image data of Y, M, C and K (primary colors of toners), and further converts a gradation toner signal of the process color into a binary (i.e., on/off) toner signal that is to be sent to the IOT 34. Having a scanner 40 and a photoreceptor belt 41, the IOT 34 converts the image data into an optical signal in its laser output section 40a, forms a latent image that corresponds to the document image onto the photoreceptor belt 41 via a polygon mirror 40b, an F/θ-lens 40c and a mirror 40d, and transfers the image onto a sheet fed from one of the paper trays 35 to output a color copy.

In the IOT 34, the photoreceptor belt 41 is driven by a drive pulley 41a, and a cleaner 41b, a charging device 41c, developers 41d of Y, M, C and K, and a transfer device 41e are disposed around the photoreceptor belt 41. A transfer unit 42, that is opposed to the transfer device 41e, holds a sheet provided from the paper tray 35 via a sheet feeding path 35a. In the case of 4-full-color copying, the four rotations are performed in the transfer unit 42 to transfer the respective images of Y, M, C and K onto the sheet, and the sheet is sent to a fuser 45 via a vacuum conveyer 43. Then, the sheet is finally output from the IOT. 34. A single sheet inserter (SSI) 35b enables a user to manually insert a selected kind of sheet into the sheet feeding path 35a.

The U/I 36 is used by a user to select his desired function and input conditions for executing that function, and includes a color display 51 and a hard control panel 52. Further, an infrared touchboard 53 is employed to enable a user to directly input his instructions through soft buttons formed on the screen.

The electrical system control unit 33 includes a plurality of controls circuit boards which are separated for the individual process units of the IIT 32, IOT 34, U/I 36, IPS, F/P 64, etc. The electrical system control unit 33 further includes a machine control board (MCB) for controlling the operations of the mechanisms of the IOT 34, ADF 62, sorter 63, etc., and a SYS circuit board for controlling all the above circuit boards.

FIGS. 4(a)–6(c) show the main part (i.e., the part related to an image combining process) of image processing apparatuses according to other embodiments of the invention.

Figure 4A:
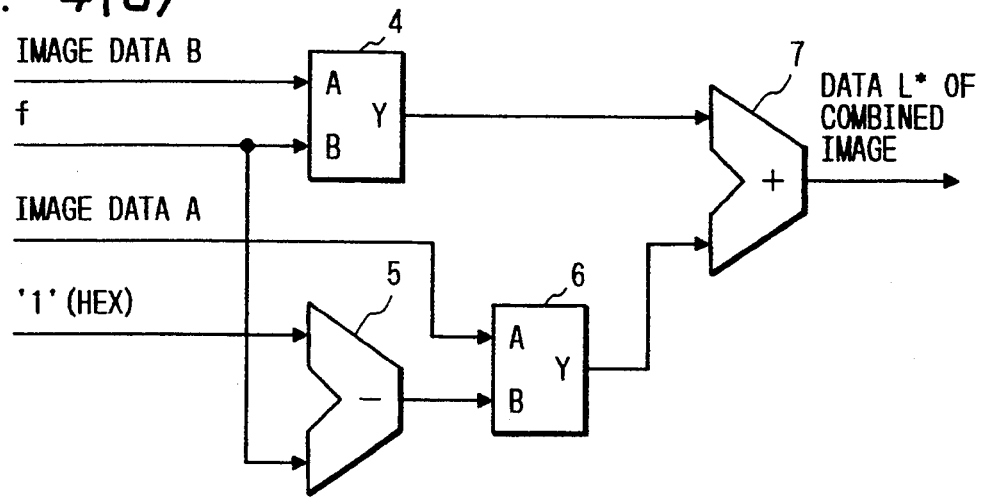
FIGS. 4 (a)–4(c) show the main part of an image processing apparatus according to another embodiment.
Figure 4B:
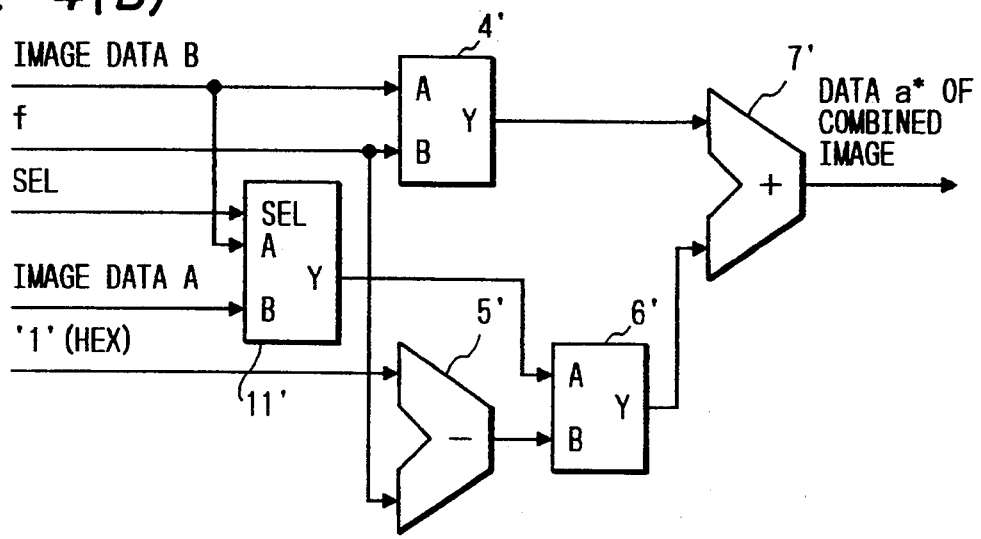
Figure 4C:
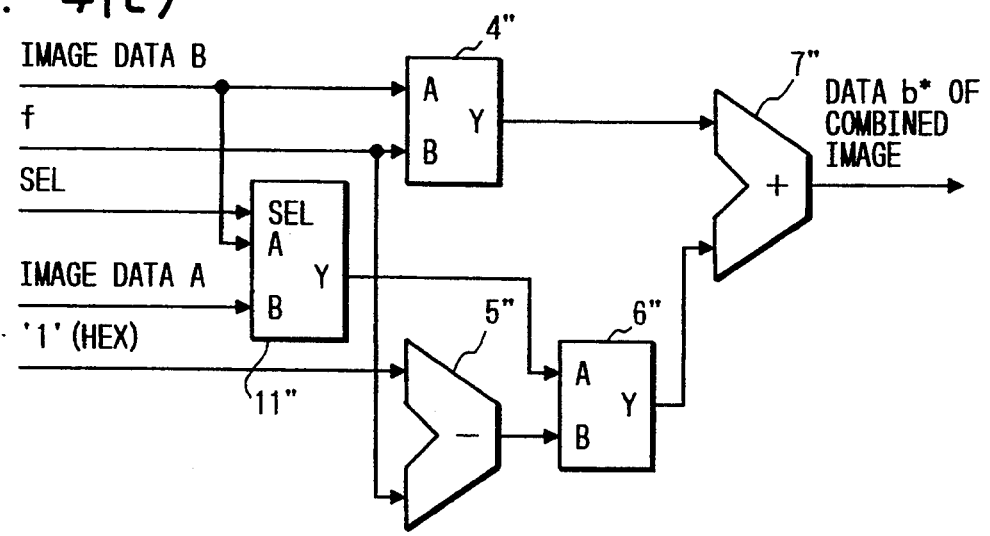

FIGS. 4(a)–4(c) show an embodiment which enables combining of a black-and-white image and a color image. The same circuit as FIG. 1(b) is employed for processing the lightness information L* (see FIG. 4(a)), and selectors 11' and 11" are provided for the chromaticity information a* and b* to use the information of the color image itself. If image data A and B represent a black-and-while image and a color image, respectively, the selectors 11' and 11" select the image data B in accordance with a selection signal SEL. If both image data A and B represent a color image, the selectors 11' and 11" select the image signal A in accordance with the selection signal SEL. That is, if the image signal A represents a black-and-white image, the selectors 11' and 11" are controlled so that the image data B itself is employed as representing the chromaticity information a* and b* and is output from adders 7' and 7". Therefore, the selectors 11' and 11" may be provided downstream of the adders 7' and 7" so as to receive the outputs of the adders 7' and 7" and the image data B to select one of these data. It is apparent that the image data A of a color image can be processed in the same manner as a black-and-white image in the above process, to combine its lightness information and another color image.

Figure 5A:
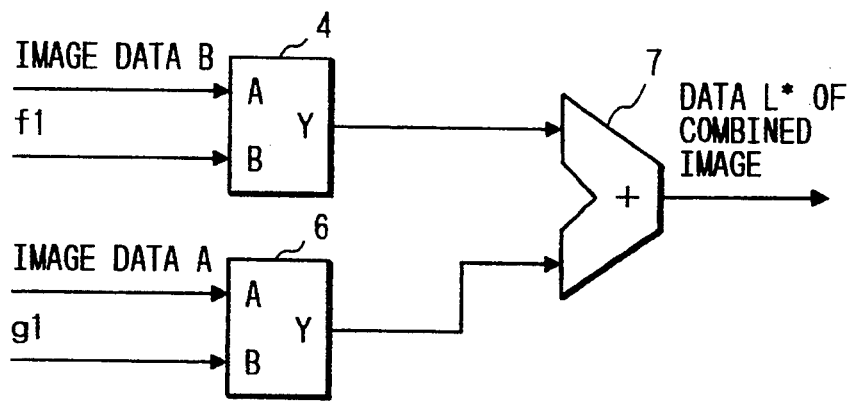
FIGS. 5(a)–5(c) show the main part of an image processing apparatus according to still another embodiment.
Figure 5B:
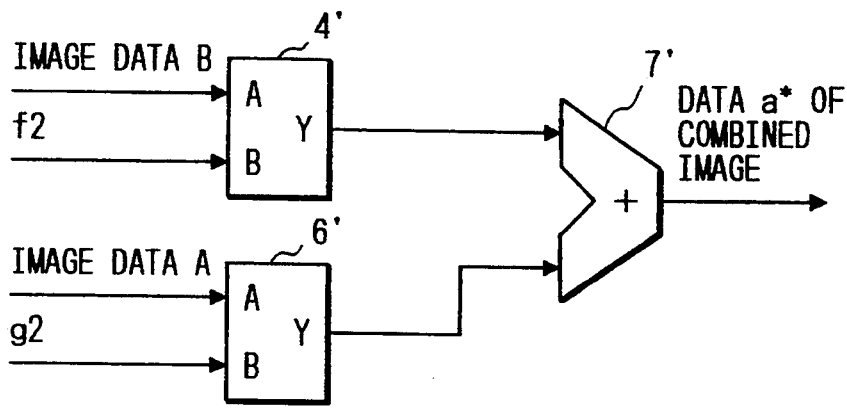
Figure 5C:
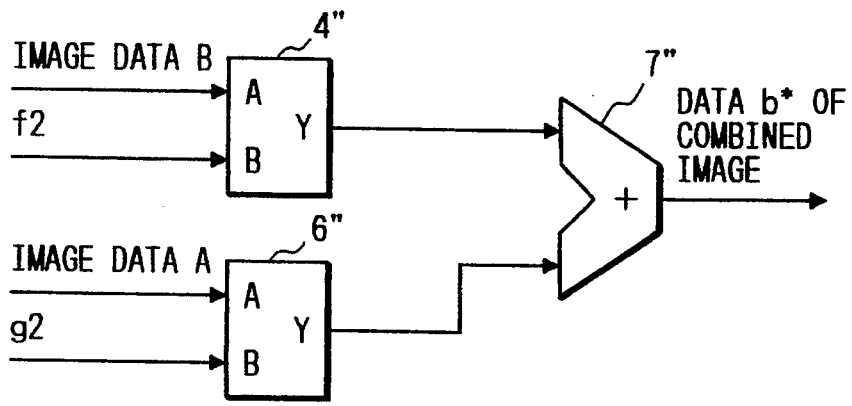

In an embodiment of FIGS. 5(a)–5(c), multiplication factors for the image data A and B can be set independently for each of the lightness information and the chromaticity information, and further the multiplication factors can be set independently for the lightness information and the chromaticity information. With these circuits, two black-and-white images can be combined by setting both factors f2 and g2 for the chromaticity information at "0". Further, the same combining operation as performed by the circuits of FIGS. 4 (a)–4(c) can be performed by setting the factor g1 at "1-f1", f2 at "1", and g2 at "0".

Figure 6A:
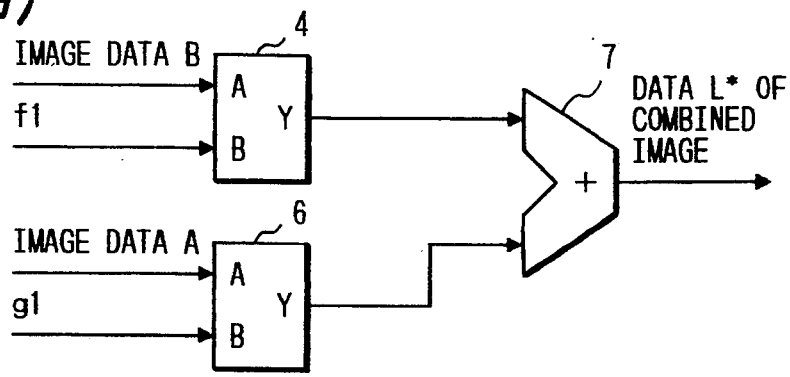
FIGS. 6(a)–6(c) show the main part of an image processing apparatus according to a further embodiment.
Figure 6B:
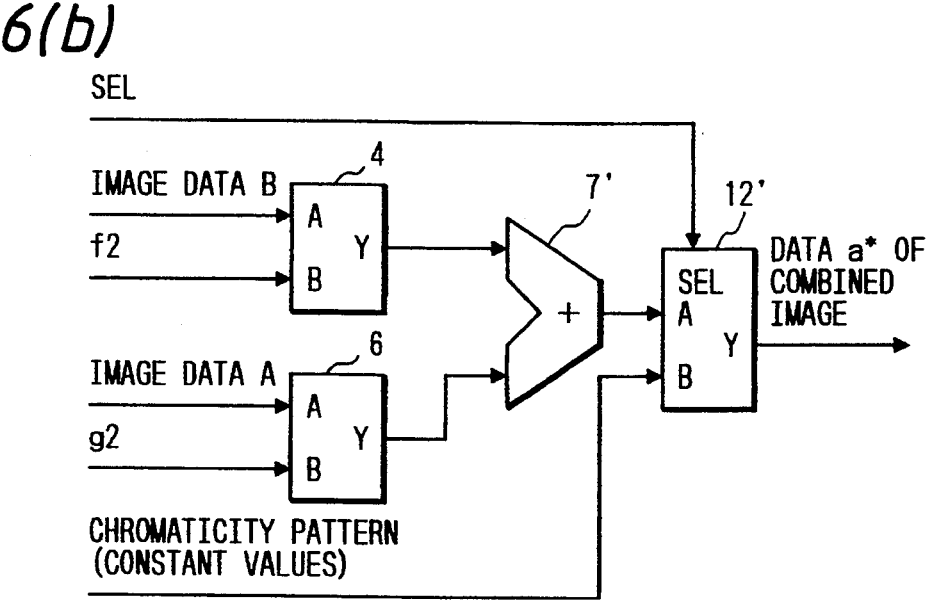
Figure 6C:
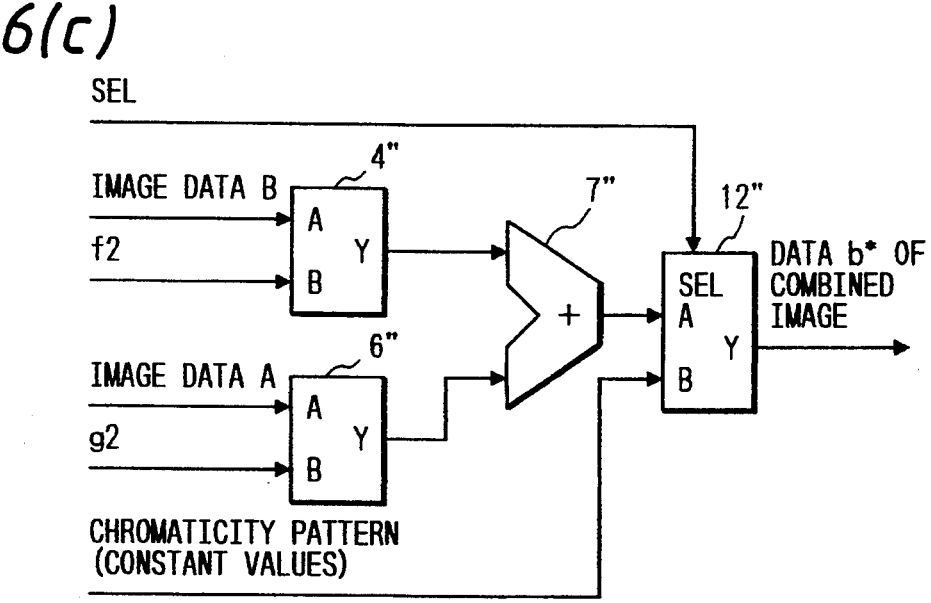
Figure 7:
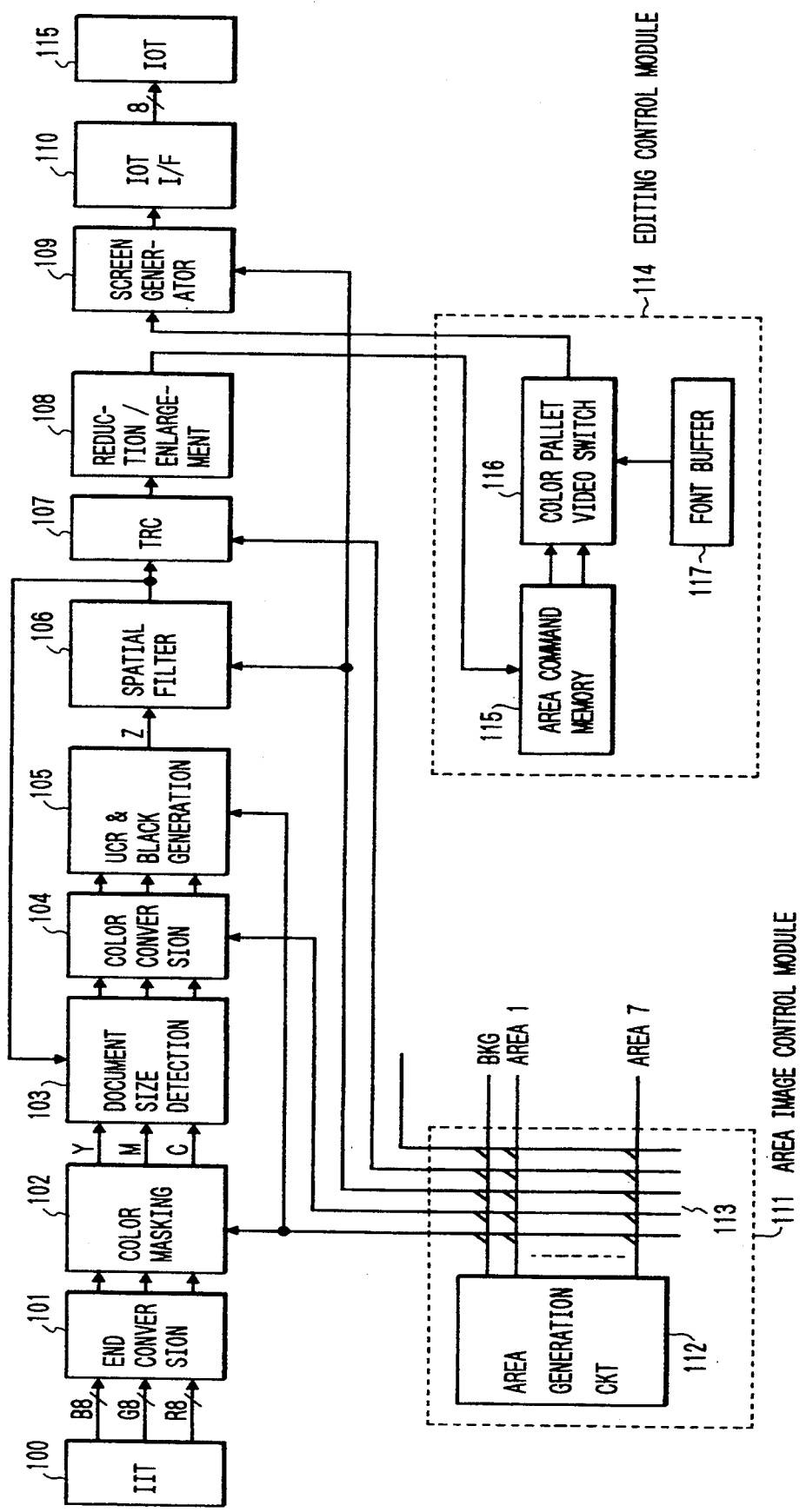
FIG. 7 shows an example of a configuration of a conventional color digital copier.

In an embodiment of FIGS. 6(a)–6(c), selectors 12' and 12" are provided downstream of the adders 7 and 7" for the chromaticity information in the circuits of FIG. 5(a)–5(c), to select and output an arbitrary chromaticity pattern. With these circuits, for instance, a chromaticity pattern of constant values is preliminarily registered as the chromaticity information, so that a mono-color-like combined image can be obtained in which the hue and saturation are fixed and only the lightness is a one as obtained by combining the image data A and B.

The present invention should not be construed as being limited to the above embodiments, but various modifications are possible. For example, in the above embodiments, the respective image data are multiplied by the multiplication factors to obtain the combined image data:

(image data B)f+(image data A)(1-f).

This may be modified to the following formula:

{(image data B)−(image data A)}f+(image data A).

In the case of this modification, one multiplier can be omitted from the circuit of FIG. 1(b). This modification can similarly be applied to the circuits of FIG. 5(a)–5(c) and to the cases of the data of B, G and R, the data of Y, M and C, or the like. Further, the combined image data may be subjected to a pixel-by-pixel selection as to whether or not the data have been subjected to the perspective combining operation, in accordance with an area signal provided externally.

As described in the foregoing, according to the invention, the combining proportion can be adjusted freely such that the multiplication factor f is set at 0.5 to produce a combined image of two images with identical contribution, or that the factor f is set at 0.9 or 0.1 to produce a combined image of two images with unequal contribution. Further, the combined image data can be output after subjected to the pixel-by-pixel selection as to whether or not the data have been subjected to the perspective combining operation. Therefore, not only images having a rectangular editing area but images having an arbitrarily shaped area can be processed without causing any problems. Further, the combining operation can deal with not only the signals L*, a* and b* of the equivalent color space but the signals of B, G and R, signals of Y, M and C, or the like. Therefore, two television images, two images displayed on a CRT of a workstation etc., two output data of a color copier, and other kinds of two images can be combined according to the invention.

What is claimed is:

1. An image processing apparatus comprising:
   first color conversion means for converting plural sets of color-decomposed signals representing a plurality of images into plural sets of equivalent color space signals;
   image processing means for combining the plural sets of equivalent color space signals to produce a set of combined equivalent color sapce signals representing a combined image; and
   second color conversion means for converting the set of combined equivalent color space signals into a set of colorant signals to be used for reproducing the combined image,
   the image processing means receiving two sets of equivalent color space signals and comprising means for assigning two weight factors having a sum of unity to the two respective sets of equivalent color space signals so that the two sets of equivalent color space signals are combined according to the respective weight factors.

2. The apparatus of claim 1, further comprising means for reading the plurality of images to produce the plural sets of color-decomposed signals.

3. An image processing apparatus comprising:
   first color conversion means for converting plural sets of color-decomposed signals representing a plurality of images into plural sets of equivalent color space signals;
   image processing means for combining the plural sets of equivalent color space signals to produce a set of combined equivalent color sapce signals representing a combined image; and
   second color conversion means for converting the set of combined equivalent color space signals into a set of colorant signals to be used for reproducing the combined image, the image processing means comprising means for assigning a plurality of independent weight factors to the plural respective sets of equivalent color space signals so that the plural set of equivalent color space signals are combined according to the respective weight factors.

4. An image processing apparatus comprising:
   first color conversion means for converting plural sets of color-decomposed signals representing a plurality of images into plural sets of equivalent color space signals;
   image processing means for combining the plural sets of equivalent color space signals to produce a set of combined equivalent color sapce signals representing a combined image; and
   second color conversion means for converting the set of combined equivalent color space signals into a set of colorant signals to be used for reproducing the combined image,
   the image processing means comprising means for independently assigning a first set of weight factors to lightness information of the plural respective sets of equivalent color space signals and a second set of equivalent color space signals and a second set of weight factors to chromaticity information of the plural respective sets of equivalent color space signals.

5. The apparatus of claim 4, wherein the image processing means comprises means for selecting between chromaticity information of the set of combined equivalent color space signals and separately provided chromaticity information.

6. The apparatus of claim 4, wherein the image processing means comprises means for selecting between chromaticity information of the set of combined equivalent color space signals and chromaticity information of one of the plural sets of equivalent color space signals.

* * * * *

UNITED STATES PATENT AND TRADEMARK OFFICE
CERTIFICATE OF CORRECTION

PATENT NO. : 5,414,529
DATED : May 09, 1995
INVENTOR(S) : Yoshihiro TERADA et al It is certified that error appears in the above-indentified patent and that said Letters Patent is hereby corrected as shown below:

On the title page, under " Attorney, Agent, or Firm", after "Henderson" insert --,--;

Item [21], change "887,424" to --882,424--.

Claim 1, Column 11, Line 21, change "sapce" to --space--.

Claim 3, Column 12, Line 1, change "sapce to --space--.

Claim 3, Column 12, Line 6, BEGIN NEW LINE FLUSH LEFT WITH "the image processing means".

Claim 4, Column 12, Line 19, change "sapce" to --space--.

Signed and Sealed this

Twenty-first Day of November, 1995

Attest:

BRUCE LEHMAN

Attesting Officer

Commissioner of Patents and Trademarks